United States Patent
Zillmer et al.

(10) Patent No.: US 7,840,337 B2
(45) Date of Patent: Nov. 23, 2010

(54) METHOD FOR CONTROLLING AN OVERRUN CONDITION OF A HYBRID VEHICLE AND HYBRID VEHICLE

(75) Inventors: Michael Zillmer, Sickte (DE); Matthias Holz, Lehre (DE); Ekkehard Pott, Gifhorn (DE); David Prochazka, Libosovice (CZ)

(73) Assignees: Volkswagen AG, Wolfsburg (DE); Skoda Auto A.S., Mlada Boleslav (CZ)

( * ) Notice: Subject to any disclaimer, the term of this patent is extended or adjusted under 35 U.S.C. 154(b) by 706 days.

(21) Appl. No.: 11/666,836

(22) PCT Filed: Oct. 13, 2005

(86) PCT No.: PCT/EP2005/010987

§ 371 (c)(1), (2), (4) Date: Oct. 17, 2007

(87) PCT Pub. No.: WO2006/048102

PCT Pub. Date: May 11, 2006

(65) Prior Publication Data

US 2008/0227589 A1 Sep. 18, 2008

(30) Foreign Application Priority Data

Oct. 30, 2004 (DE) .................... 10 2004 052 786

(51) Int. Cl.
*B60K 6/20* (2007.10)
*F02D 41/12* (2006.01)

(52) U.S. Cl. .................... 701/114; 180/65.21; 477/7; 701/22

(58) Field of Classification Search ............ 123/319, 123/325, 339.19; 180/65.1, 65.21, 65.28; 477/7, 14; 701/110, 114, 22

See application file for complete search history.

(56) References Cited

U.S. PATENT DOCUMENTS 4,192,279 A 3/1980 Maisch et al.

(Continued)

FOREIGN PATENT DOCUMENTS

DE 28 03 145 7/1979

(Continued)

OTHER PUBLICATIONS

International Search Report, PCT International Patent Application No. PCT/EP2005/010987, dated Dec. 2, 2005.

(Continued)

*Primary Examiner*—Hieu T Vo
(74) *Attorney, Agent, or Firm*—Kenyon & Kenyon LLP

(57) ABSTRACT

A method is for controlling an overrun condition in a hybrid vehicle having a combustion engine and additionally at least one electric motor as well as an overrun fuel cutoff, which interrupts a fuel supply to the combustion engine when the vehicle is in an overrun condition and restores the fuel supply when the combustion engine reaches or falls below a restoring speed. At least in a combustion engine at operating temperature, the fuel supply is restored at a restoring speed of at most 200 min$^{-1}$, e.g., at most 100 min$^{-1}$ above an idling speed of the combustion engine. The restoring speed may be in the range of the idling speed or only slightly above the latter. The restoring speed is thus clearly lowered as compared to the usual restoring speeds and extends the overrun fuel cutoff phases and thus reduces fuel consumption.

12 Claims, 3 Drawing Sheets

U.S. PATENT DOCUMENTS

| | | | |
|---|---|---|---|
| 6,109,237 | A | 8/2000 | Pels et al. |
| 6,190,284 | B1 | 2/2001 | Kuroda et al. |
| 6,192,847 | B1 | 2/2001 | Davis |
| 6,334,499 | B1 | 1/2002 | Matsubara et al. |
| 6,376,927 | B1 | 4/2002 | Tamai et al. |
| 6,422,972 | B1 | 7/2002 | Eguchi |
| 6,443,126 | B1 | 9/2002 | Morimoto et al. |
| 6,742,614 | B2 * | 6/2004 | Morimoto et al. ........ 180/65.26 |
| 7,377,256 | B2 * | 5/2008 | Glora ......................... 123/325 |
| 7,698,050 | B2 * | 4/2010 | Ludwig et al. .............. 701/104 |
| 2002/0134596 | A1 | 9/2002 | Morimoto et al. |

FOREIGN PATENT DOCUMENTS

| | | |
|---|---|---|
| DE | 44 43 312 | 6/1995 |
| DE | 197 04 153 | 8/1998 |
| DE | 199 11 736 | 9/1999 |
| DE | 100 47 969 | 5/2001 |
| DE | 100 45 157 | 6/2001 |
| EP | 1 074 417 | 2/2001 |
| JP | 2000-238555 | 9/2000 |
| WO | WO 98/14702 | 4/1998 |

OTHER PUBLICATIONS

Written Opinion of the International Searching Authority, PCT International Patent Application No. PCT/EP2005/010987, dated Dec. 2, 2005 (English-language translation provided).

International Preliminary Report on Patentability, PCT International Patent Application No. PCT/EP2005/010987, dated Sep. 22, 2006 (English-language translation provided).

Search Report, German Patent Application No. 10 2004 052 786.5, dated Jul. 5, 2005.

* cited by examiner

METHOD FOR CONTROLLING AN OVERRUN CONDITION OF A HYBRID VEHICLE AND HYBRID VEHICLE

FIELD OF THE INVENTION

The present invention relates to a method for controlling an overrun condition of a hybrid vehicle having a combustion engine and additionally at least one electric motor. The vehicle furthermore has an overrun fuel cutoff, which interrupts a fuel supply to the combustion engine when the vehicle is in an overrun condition and which restores the fuel supply when the combustion engine reaches or falls below a restoring speed. Furthermore, the present invention relates to a hybrid vehicle having a corresponding overrun fuel cutoff control.

BACKGROUND INFORMATION

Hybrid vehicles include motor vehicles, in which at least two drive units are combined with each other, which utilize different energy sources to provide the power for driving the vehicle. The characteristics of a combustion engine, which generates kinetic energy by burning gasoline or diesel fuels, and of an electric machine, which converts electrical energy into kinetic energy, complement each other, which is why today's hybrid vehicles are predominantly equipped with such a combination. It is possible to distinguish two different hybrid arrangements. In so-called serial or sequential hybrid arrangements, the vehicle is driven exclusively by the electric motor, while the combustion engine generates, via a separate generator, the electric current for charging an energy storage device that powers the electric motor or for powering the electric motor directly. Today, by contrast, parallel hybrid arrangements are preferred, in which the vehicle may be driven both by the combustion engine as well as by the e-motor. In such parallel arrangements, the electric motor, for instance, is typically switched on to support the combustion engine at operating points having higher vehicle loads.

In hybrid vehicles, it is advantageous for reasons of fuel consumption to use in the various operating states of the vehicle respectively the drive source that exhibits the better efficiency in the given rotational speed-load range.

Accordingly, one generally strives to operate the combustion engine as seldom as possible or not at all in idling operation, in which it exhibits a particularly low efficiency. For this purpose, hybrid vehicles are equipped with an automatic start-stop system including an automatic switch-off system, which automatically switches the combustion engine off (or suppresses the restart of the combustion engine) when stop conditions obtain, and an automatic switch-on system, which starts the combustion engine automatically when start conditions obtain. In particular, the combustion engine is switched off by the automatic switch-off system in standstill phases, that is to say, when the vehicle speed is zero. Automatic start-stop systems make use of the fact that hybrid vehicles have considerably more powerful electric starter motors than is provided in conventional starters, which allows for a rapid engine run-up, particularly when restarting after an automatic stop.

Also for reasons of consumption, modern combustion engines normally operate with an overrun fuel cutoff both in conventional as well as in hybrid arrangements when there is zero torque demand, that is, in an overrun situation in which a demanded torque (the driver's desired torque) is smaller than a current vehicle propulsion. In the overrun fuel cutoff, the fuel supply to the combustion engine is interrupted above a restoring speed. This measure makes it possible to reduce fuel consumption, for example, in deceleration phases in which the driver relieves the accelerator pedal and/or operates the brake pedal. If in the further course, for example, following a disengagement of the clutch in the deceleration phase, the engine speed falls below this restoring speed, then the fuel supply is again activated such that the engine is "caught" and can subsequently continue to run at its idling speed. The speed reserve between the idling speed and the restoring speed is required since the combustion engine, when the speed is dropping, if indicated requires a certain time for opening the throttle valve and for building up a torque reserve in order to build up a sufficiently high torque and to catch the speed drop before it reaches the idling speed. For the above reasons, the restoring speed cannot be lowered at will. It typically lies at a minimum of 300 to 400 $min^{-1}$ above the idling speed. Like the idling speed, the restoring speed is also specified as a function of the engine temperature. For example, a typical restoring speed of a 4-cylinder Otto engine at operating temperature (coolant temperature approx. 85 to 90° C.) lies at around 1100 $min^{-1}$ and at an engine temperature of 20° C. already at 1300 $min^{-1}$. The reasons for the increased restoring speeds at low engine temperatures are, on the one hand, the higher friction losses due to the drag torques of the combustion engine that must be overcome and, on the other hand, in less favorable combustion chamber boundary conditions, which counteract the buildup of an engine torque due to higher heat losses and a lower mixture formation quality.

SUMMARY

Example embodiments of the present invention modify the overrun condition of a hybrid vehicle compared to conventional arrangements with a view to reducing the fuel consumption.

A method according to example embodiments of the present invention provides for the overrun fuel cutoff to interrupt the fuel supply (and optionally the ignition as well) of the combustion engine when the vehicle is in an overrun condition and for restoring the fuel supply when a restoring speed is reached or undershot, which at least in a combustion engine at operating temperature lies maximally at 200 $min^{-1}$ above the idling speed of the combustion engine.

The restoring speed may thus be lowered compared to conventional arrangements by at least 100, e.g., by at least 150, e.g., by more than 200 $min^{-1}$. Consequently, the overrun phases operated with an interrupted fuel supply are extended, which results in fuel savings. For this purpose, if required, a torque intervention of the electric motor may be used to support the combustion engine torque buildup and to adjust the combustion engine to its idling speed. For this purpose, the ability of electric motors to provide relatively high torques within the shortest time is particularly advantageous. For example, a torque of 100 Nm can be built up within 50 to 100 ms.

The restoring speed may be lowered even further. Thus, there may be a provision to reactivate the fuel supply only at a restoring speed of at most 150, e.g., at most 100, and, e.g., at most 50 $min^{-1}$ above the idling speed. Depending on the type of construction of the combustion engine (number of cylinders, compression, etc.) and the power output of the e-machine, the restoring speed may even be lowered to at most 20 $min^{-1}$ above the idling speed or even to the idling speed.

It is possible according to conventional strategies to specify the idling speed and/or the restoring speed, e.g., in an equidistant manner, as a function of the temperature of the combustion engine (or of its coolant temperature) such that with lower engine temperatures higher idling speeds and/or restoring speeds are specified. By contrast, example embodiments of the present invention provide for the idling speed and/or the restoring speed to be specified independently of the temperature of the combustion engine, which makes it possible to reduce the fuel consumption further. This refinement is implemented especially in particularly powerful electric motors. It is also possible to specify the speed thresholds as a function of temperature, but to provide smaller temperature-dependent shifts for this purpose than in conventional arrangements.

As indicated above, the torque of the electric motor may be used to decelerate the speed drop of the combustion engine and/or subsequently to adjust the combustion engine to its idling speed. For this purpose, the electric motor is activated prior to, concurrently with, or following the restoration of the fuel supply, and the electric motor torque is superposed on the combustion engine, e.g., on its crankshaft. The torque of the electric motor may be further used to support a buildup of a so-called torque reserve of the combustion engine while idling. For this purpose, the torque reserve is built up by an increased cylinder charge level of the combustion engine and compensated by an efficiency-reducing measure, e.g., by an ignition retard. Such a torque reserve is maintained in the event of a rapid positive torque demand, for example, for accelerating a vehicle, and may be released when required by a quickly implementable ignition advance. The idling operation of the combustion engine may occur after restoring the fuel supply in an overrun condition, but without building up a torque reserve. This means that the cylinder charge level of the combustion engine is adjusted in an efficiency-optimized manner precisely to the torque required for setting the idling speed. In the event of a sudden torque demand on the part of the driver, the torque is provided at least in part by the electric motor. Dispensing with a torque reserve during the idling operation of an overrun phase allows for a further reduction of the fuel consumption.

The supporting torque of the electric motor may not be activated until and may be activated only when the speed of the combustion engine falls below a permissible lower speed threshold below the restoring speed, e.g., below the idling speed. Alternatively, the speed characteristic of the combustion engine, e.g., the steepness of the speed drop, can be tracked and compared to a setpoint speed characteristic and the electric motor torque activated only when a difference between the actual and the setpoint speed characteristic exceeds a specified difference threshold value. In this manner, it is possible entirely to dispense with activating the electric motor for catching the combustion engine. This procedure may provide that the energy to be drawn from an electric energy storage device for the e-motor is limited to a minimum. This method management is thus particularly suitable for energy storage devices of relatively low capacity or when the energy storage devices currently have low current levels of charge.

Positive and negative torques of the electric motor may be alternately superposed on the combustion engine or its crankshaft for decelerating the combustion engine and/or for adjusting it to the idling speed. This alternating operation of the electric motor may be activated shortly before the restoration of the fuel supply to the combustion engine. In this manner, the torque buildup of the combustion engine is dampened by the alternating electromotive application of positive and negative torques. The result is a very "smooth" and comfort-optimized restoration, which occurs practically unnoticed by the driver. This procedure is implemented particularly when the restoration occurs while a gear of the manual or automatic transmission is engaged (and the clutch is closed) since it is thus possible to suppress undesired accelerations or reductions in the vehicle deceleration by the torque buildup of the combustion engine.

Example embodiments of the present invention relate to a hybrid vehicle having a combustion engine and additionally at least one electric motor. The vehicle has an overrun fuel cutoff control, which is arranged to implement the method described above, e.g., to restore the fuel supply, at least in a combustion engine at operating temperature, at a restoring speed of at most 200 $min^{-1}$ above the idling speed of the combustion engine.

The overrun fuel cutoff control includes a program algorithm for controlling the required method steps, it being possible for the program algorithm to be stored in a general engine control unit or in a separate control unit.

Example embodiments of the present invention are explained in more detail below with reference to the appended Figures.

DETAILED DESCRIPTION

Figure 1:
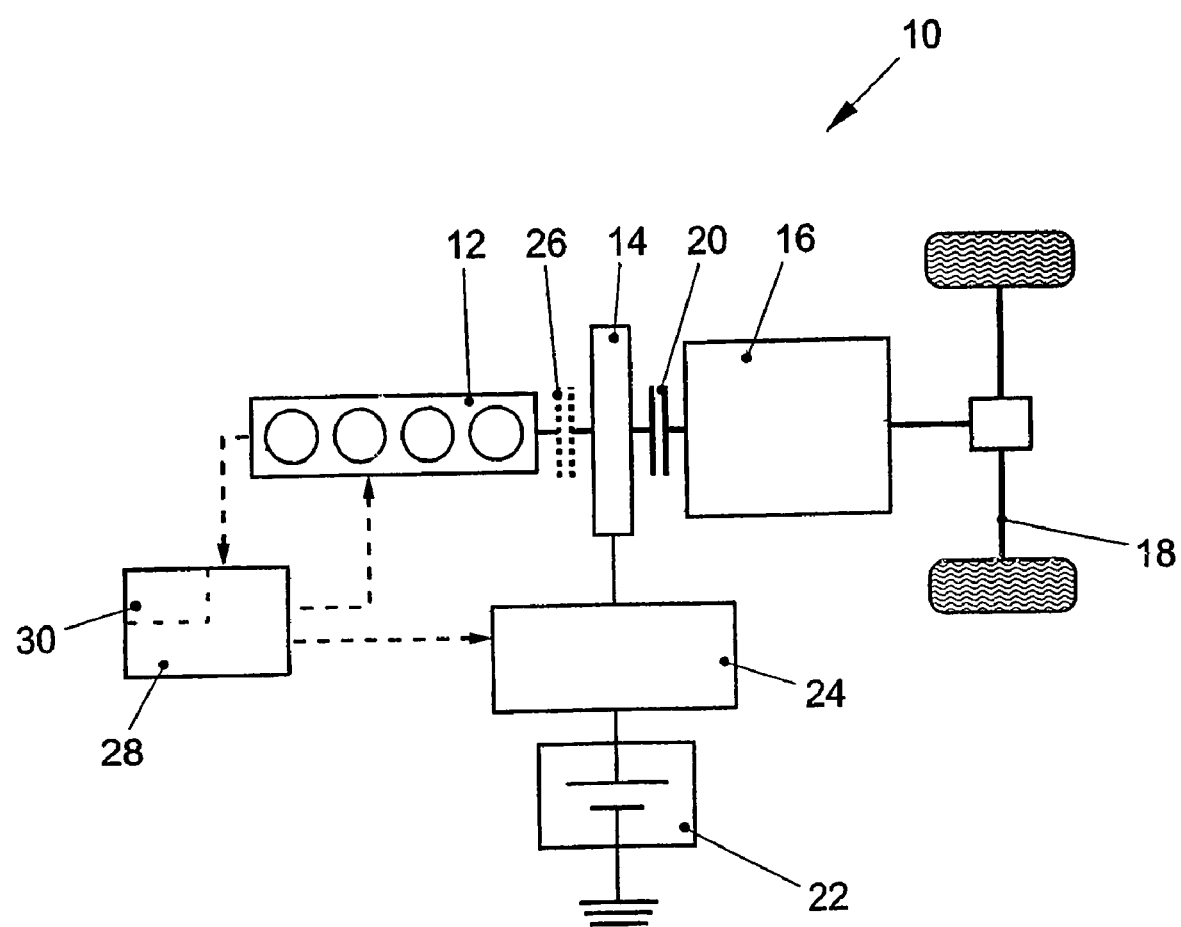
FIG. 1 is a schematic representation of the structure of a hybrid drive unit according to an example embodiment of the present invention.

In FIG. 1, 10 denotes on the whole a parallel hybrid drive unit of a hybrid vehicle. The vehicle is driven alternatively or simultaneously by a conventional combustion engine 12 (Otto or diesel engine) and an electric motor 14, both of which act on the same shaft, e.g., on the crank shaft of combustion engine 12. Electric motor 14 may be connected to the engine crankshaft in various manners. Thus, electric motor 14 may be connected to the crankshaft directly or via a clutch, or via a belt drive, a toothed belt, a gear unit or another friction- and/or form-locking connection. Combustion engine 12 and electric motor 14 are connected to an indicated drive train 18 via a transmission 16, e.g., a manually shifted transmission. The drive shafts of combustion engine 12 or of electric motor 14 are decoupled from transmission 16 via a clutch 20, which may be opened by the driver by operating a clutch pedal and which is closed when the clutch pedal is not operated.

Electric motor 14, which is a three-phase asynchronous motor or three-phase synchronous motor, for instance, may be operated alternatively as a motor or as a generator. When operated as a motor, electric motor 14 drives drive train 18 by using electrical energy (current). Electric motor 14 obtains the latter from an energy storage device 22, which may be, for instance, a battery and/or a capacitor storage device. When operated as a motor, electric motor 14 can also support combustion engine 12 when the latter is switched on. When operated as a generator, by contrast, electric motor 14 is driven by combustion engine 12 or by an overrun of the vehicle and converts the kinetic energy into electric energy for charging energy storage device 22. Electric motor 14 is switched between motor and generator operation by a power electronics 24, which at the same time performs a possibly required conversion between direct and alternating current.

The vehicle is driven predominantly by combustion engine 12, which is started by electric motor 14 configured as a starter generator. In addition, electric motor 14 assumes a boost function in that it is switched on in high load situations, e.g., when the vehicle accelerates, to support the vehicle drive (motor operation). On the other hand, in driving situations where the vehicle has an excess of kinetic energy, electric motor 14 has a so-called recuperating function in that, by operating as a generator, it converts the energy of motion into kinetic energy for charging energy storage device 22 and thus simultaneously provides a brake torque. An electric motor 14 particularly suitable in this connection has a power output, e.g., of at most 40 kW, e.g., of at most 20 kW, e.g., in the range of 8 to 15 kW, e.g., approximately 13 kW.

Furthermore, an optional additional clutch 26 is indicated in FIG. 1, which may be disposed between combustion engine 12 and electric motor 14. Such an additional clutch 26 allows for combustion engine 12 to be separately decoupled from drive train 18 or from electric motor 14, which provides that its mechanical friction resistances need not be dragged along when combustion engine 12 is switched off. Additional clutch 26 thus results in an additional potential for saving fuel, although it involves a substantial expenditure in terms of costs, construction and space. Thus, although additional clutch 26 between combustion engine 12 and electric motor 14 is possible, it may not be provided.

The operation of combustion engine 12 and of power electronics 24 is controlled by an engine control unit 28, into which an overrun fuel cutoff control (indicated by 30) is integrated in the form of a program algorithm. Alternatively, overrun fuel cutoff control 30 may also be provided in a separate control unit.

Figure 2:
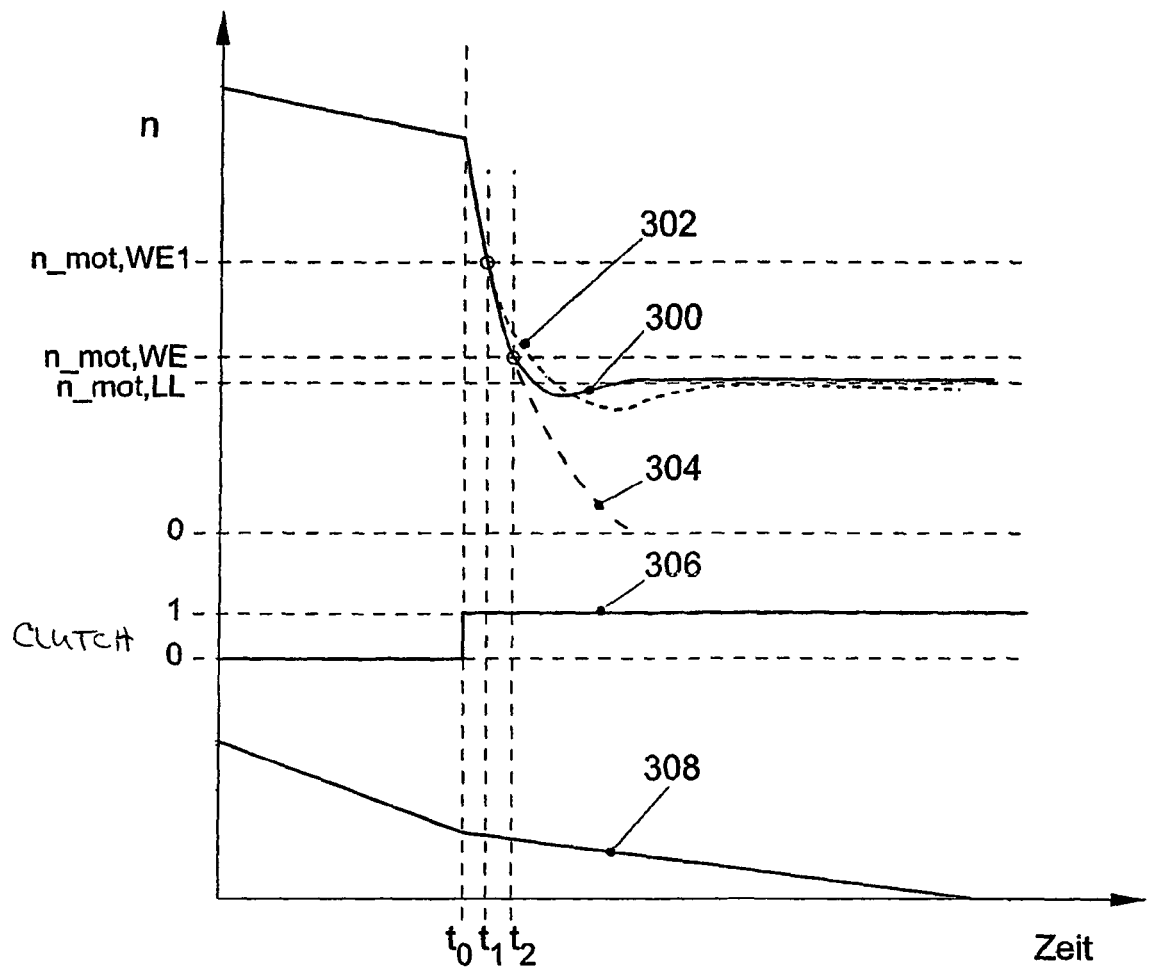
FIG. 2 illustrates time characteristics of various characteristic quantities during an overrun fuel cutoff of a conventional hybrid vehicle and a hybrid vehicle according to an example embodiment of the present invention.

FIG. 2 shows the time characteristics of engine speed n of combustion engine 12 (curves 300, 302 and 304), the state of clutch 20 (curve 306), and the vehicle speed (curve 308) during an overrun fuel cutoff. In this instance, curve 300 shows the rotational speed characteristic according to the method management of an example embodiment of the present invention, curve 302 shows a conventional rotational speed characteristic in a case of a properly timed restoration of the fuel supply and curve 304 in a case when the fuel supply is restored too late.

Initially, while clutch 20 is closed (clutch=0), the vehicle is in a deceleration phase, in which the driver releases the accelerator pedal ("takes the foot from the gas") in order to decelerate the vehicle gradually. In this situation, the engine brake takes effect, the vehicle velocity vFzg being lowered in the process and the engine speed n dropping in accordance with the drive train transmission ratio. There exists an overrun condition, in which both according to the conventional method (curve 302) as well as according to the example embodiment of the present invention (curve 300) an overrun fuel cutoff of combustion engine 12 occurs, that is, an interruption of the fuel supply, in order to save fuel. In addition, the ignition may be interrupted as well. At time $t_0$, the driver opens clutch 20 by depressing the clutch pedal. This disconnects combustion engine 12 from drive train 18 and thus releases the engine brake, as a result of which the vehicle deceleration slows, whereas engine speed n drops very quickly.

According to the conventional method, at time $t_1$, that is, when engine speed n reaches a conventional restoring speed n_mot,WE1, the fuel injection sets in again in order to adjust idling engine 12 to idling speed n_mot,LL. Restoring speed n_mot,WE1 in this instance typically lies at least at 300 to 400 min$^{-1}$ above idling speed n_mot,LL. The idling operation allows the vehicle to be accelerated again following a process of engaging the clutch and a synchronization of the speed on the part of the driver. In conventional arrangements, a torque reserve is additionally built up while idling in that the cylinder charge of combustion engine 12, that is, the air quantity and accordingly the fuel quantity supplied to combustion engine 12, is increased and the additional torque potentially created is compensated by an ignition timing retard. The cylinder charge set for this purpose thus exceeds the charge that is required for the mere idling operation. The torque reserve is mobilized, in the event that a high torque is suddenly demanded, by shifting the ignition timing again in the advance direction, in particular to an efficiency-optimized ignition angle.

Catching combustion engine 12 early at restoring speed n_mot,WE1 in accordance with the conventional arrangement is necessary in order to give the combustion engine sufficient time for building up torque and possibly reserve torque and to prevent it from stalling. In particular, the speed reserve is required for opening a throttle valve or for setting the required cylinder charge. If the fuel supply is restored too late, then engine speed n drops to 0 zero and the engine stalls (curve 304).

In contrast to the conventional method, according to example embodiments of the present invention, the restoring speed is markedly lowered, e.g., to a value that is at most 100 min$^{-1}$ above idling speed n_mot,LL. With the restoring speed n_mot,WE lowered in accordance with the method hereof, the restoring time is retarded significantly backward such that, as shown in FIG. 2, the restoration only occurs at time $t_2$ (curve 300). In the process, a torque of electric motor 14 may be superposed on the engine crankshaft for braking the speed drop of combustion engine 12 and for setting it to idling speed n_mot,LL. Since e-motors provide a high torque (positive and negative) especially in the lower speed range and the electric motor torques can be built up and reduced very quickly (some ten ms), this provides the option in hybrid arrangements of supporting the restoring operation of combustion engine 12. As soon as the torque buildup for the idling operation is concluded, the torque of electric motor 4 can be reduced again to zero. Combustion engine 12 is thus restored and transferred into its idling speed as late as possible. Due to the higher control torques that are possible, the method hereof can even be used to achieve small speed underswings and at the same time a quicker adjustment of the setpoint idling speed. Speed underswings may be avoided entirely in this operating phase.

Figure 3:
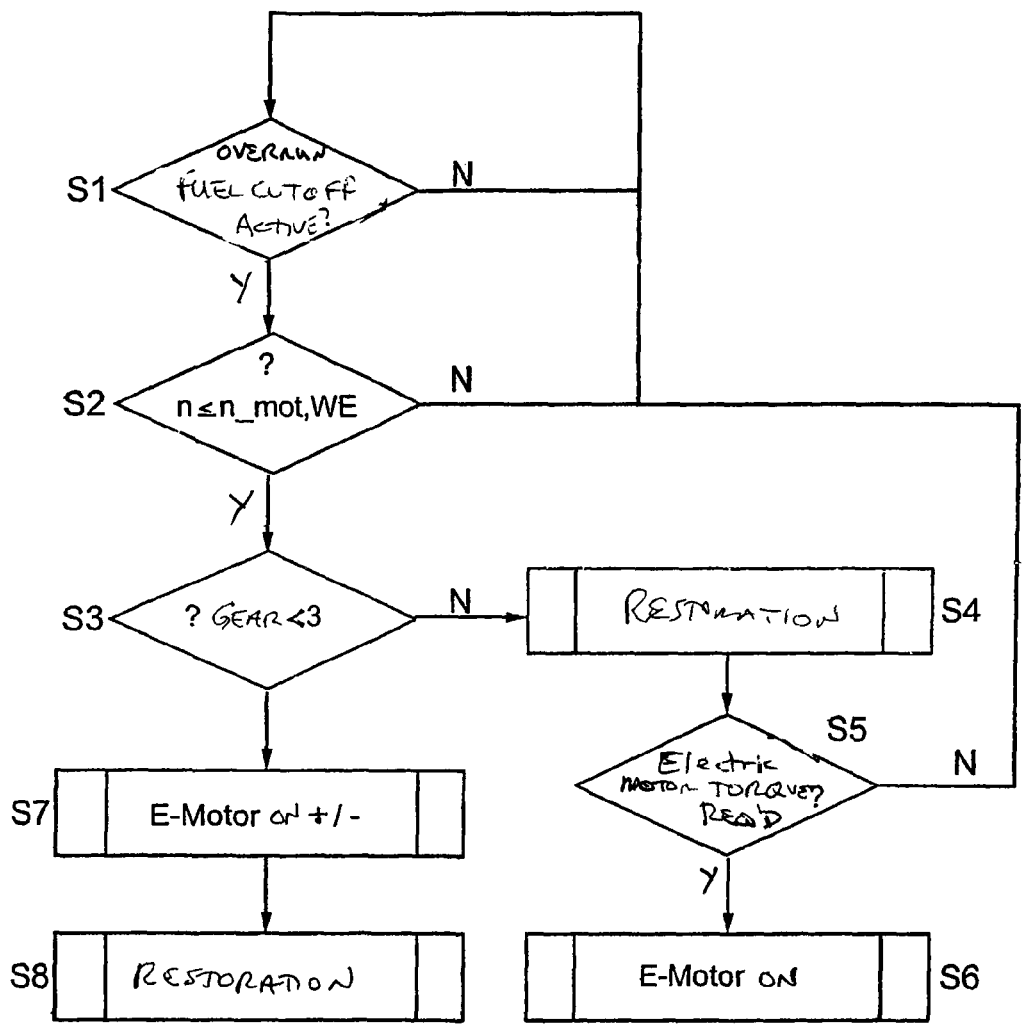
FIG. 3 is a flow chart illustrating a procedure for implementing the overrun fuel cutoff according to an example embodiment of the present invention.

Details of the method management according to an example embodiment of the present invention may be gathered from FIG. 3. The method starts in Step S1 with a query as to whether the overrun fuel cutoff is activated. If this question is answered in the affirmative, that is, the vehicle is in an overrun condition and the fuel supply to combustion engine 12 is interrupted, then the method proceeds to step S2, where a check is performed as to whether the speed n of combustion engine 12 has reached or fallen below restoring speed n_mot,WE. If this query is also answered in the affirmative, then prerequisites are fulfilled for restoring combustion engine 12.

Before restarting the fuel supply, however, a check is performed in S3 as to whether no gear or a low gear, for example, the first, second or the reverse gear, is engaged in transmission 16 while clutch 20 is closed. If the query is answered in the negative in step S3, that is, a relatively high gear (e.g., third gear or higher) is engaged while clutch 20 is closed, then the fuel injection of combustion engine 12 is immediately restored in step S4 and in connection with this the idle speed control is restored as well. Since the system should do without activating electric motor 12 if possible, the method proceeds to step S5, where a check is performed as to whether the provision of an electric motor torque is necessary for "catching" the speed drop of combustion engine 12. The check may involve, for example, checking whether engine speed n has dropped below a specified lower speed threshold, which lies, for example, just below idling speed n_mot,LL. Alternatively or additionally, the characteristic of the speed drop may be checked in step S5. If a steepness of the speed drop is greater than a respective setpoint value, for example, this may mean that combustion engine 12 can be prevented from stalling only by the electromotive support of e-motor 14. In this instance, the method proceeds to step S6, in which the electric motor is activated and a positive electric motor torque is superposed on combustion engine 12.

If, on the other hand, the query in step S3 is answered in the affirmative, that is, no gear or only a low gear is engaged, then first in step S7 electric motor 14 is activated in alternating operation in that it superposes by turns a positive and a negative torque on the crankshaft of combustion engine 12. This makes it possible to dampen the restoration subsequently occurring in step S8 such that an especially comfort-optimized smooth transition is made to the combustion engine acceleration state. In particular, the driver is thus not impaired in terms of travel comfort by a positive torque jump, which may occur especially as a result of the relatively high drive train transmission ratio. On the other hand, when clutch 20 is open, combustion engine 12 is securely prevented from stalling by the parallel activation of e-machine 14.

LIST OF REFERENCE NUMERALS

10 hybrid drive unit
12 combustion engine
14 electric motor
16 transmission
18 drive train
20 clutch
22 energy storage device/battery
24 power electronics
26 additional clutch
28 engine control unit
30 overrun fuel cutoff control

What is claimed is:

1. A method for controlling an overrun condition of a hybrid vehicle having a combustion engine, at least one electric motor and an overrun fuel cutoff configured to cut off a fuel supply to the combustion engine when the vehicle is in an overrun condition and to restore the fuel supply when the combustion engine at least one of (a) reaches and (b) falls below a restoring speed, comprising:
   restoring the fuel supply, at least for the combustion engine at operating temperature, at a restoring speed of at most 200 rpm above an idling speed of the combustion engine;
   superimposing a torque of the electric motor on the combustion engine as a support for at least one of (a) decelerating the combustion engine and (b) adjusting the combustion engine to the idling speed at least one of (a) before, (b) during and (c) following the restoration of the fuel supply to the combustion engine;
   wherein the superimposing includes alternately superimposing positive and negative torques of the electric motor on the combustion engine for at least one of (a) decelerating the combustion engine and (b) adjusting the combustion engine to the idling speed.

2. The method according to claim 1, wherein the restoring speed is one of (a) at most 150 rpm, (b) at most 100 rpm and (c) at most 50rpm above the idling speed.

3. The method according to claim 1, wherein the restoring speed is one of (a) at most 20 rpm above the idling speed and (b) the idling speed.

4. The method according to claim 1, wherein at least one of (a) the idling speed and (b) the restoring speed is independent of a temperature of the combustion engine.

5. The method according to claim 1, further comprising superimposing the torque of the electric motor on the combustion engine for building up a torque reserve of an idling combustion engine that is not passed on to a crankshaft.

6. The method according to claim 1, further comprising, following the restoration of the fuel supply, adjusting a torque of the combustion engine in an efficiency-optimized manner to a torque required for setting the idling speed without building up a torque reserve.

7. The method according to claim 1, wherein the torque of the electric motor is not activated until and is activated only when a speed of the combustion engine falls below a permissible lower speed threshold, which is at least one of (a) smaller than or equal to the restoring speed and (b) smaller than the idling speed.

8. The method according to claim 1, wherein the torque of electric motor is not activated until and is activated only when a difference between an actual speed characteristic and a setpoint speed characteristic exceeds a difference threshold value.

9. The method according to claim 1, wherein the superimposing includes superimposing alternating positive and negative torques of the electric motor prior to the restoration of the fuel supply to the combustion engine.

10. A hybrid vehicle, comprising:
    a combustion engine;
    at least one electric motor;
    an overrun fuel cutoff control configured to cut off a fuel supply to the combustion engine when the vehicle is in an overrun condition and to restore the fuel supply when the combustion engine at least one of (a) reaches and (b) falls below a restoring speed, the overrun fuel cutoff control configured to restore the fuel supply, at least for the combustion engine at operating temperature, at a restoring speed of at most 200 rpm above an idling speed of the combustion engine, the overrun fuel cutoff control configured to superimpose alternately positive and negative torques of the electric motor on the combustion engine as a support to at least one of (a) decelerate the combustion engine and (b) adjust the combustion engine to the idling speed at least one of (a) before, (b) during and (c) following restoration of the fuel supply to the combustion engine.

11. The hybrid vehicle according to claim 10, wherein the overrun fuel cutoff control includes a program code stored at least one of (a) in an engine control unit and (b) in a separate control unit.

12. The hybrid vehicle according to claim 10, wherein the hybrid vehicle is configured to perform the method according to claim 1.

* * * * *